Nov. 13, 1956 H. C. CUSKIE 2,770,453

AUTOMOTIVE VEHICLE STABILIZING MEANS

Filed Sept. 9, 1952 4 Sheets-Sheet 1

INVENTOR.
Herman C. Cuskie.
BY
Harness and Harris
ATTORNEYS.

INVENTOR.
Herman C. Cuskie.
BY
Harness and Harris
ATTORNEYS.

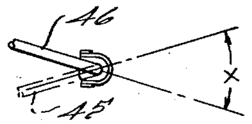
FIG. 7.
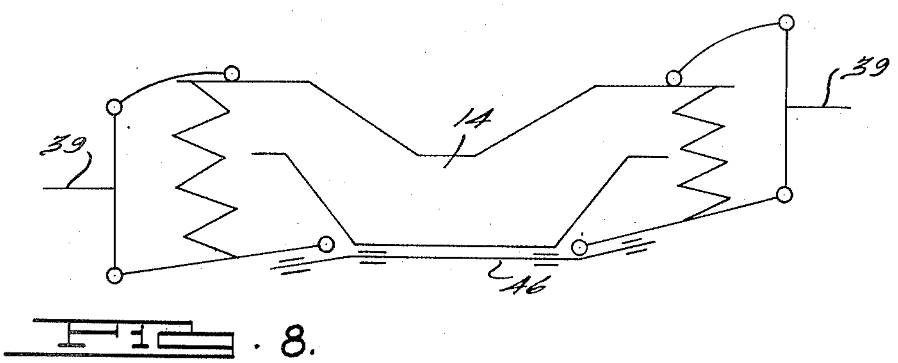
FIG. 8.
FIG. 9.
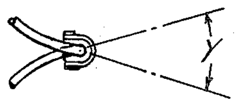
FIG. 10.
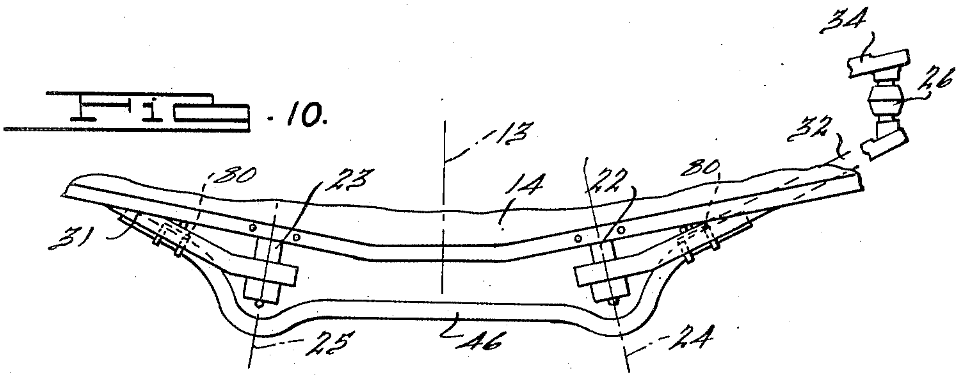
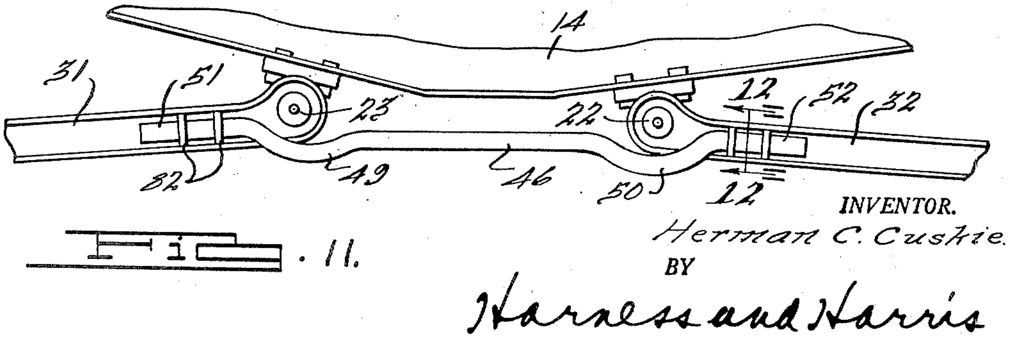
FIG. 11.
INVENTOR.
Herman C. Cuskie.
BY
Harness and Harris
ATTORNEYS.

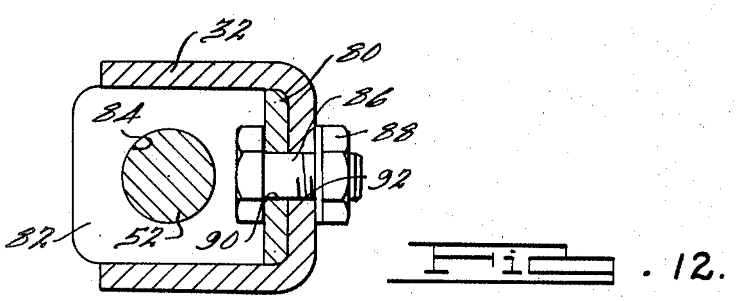
FIG. 12.
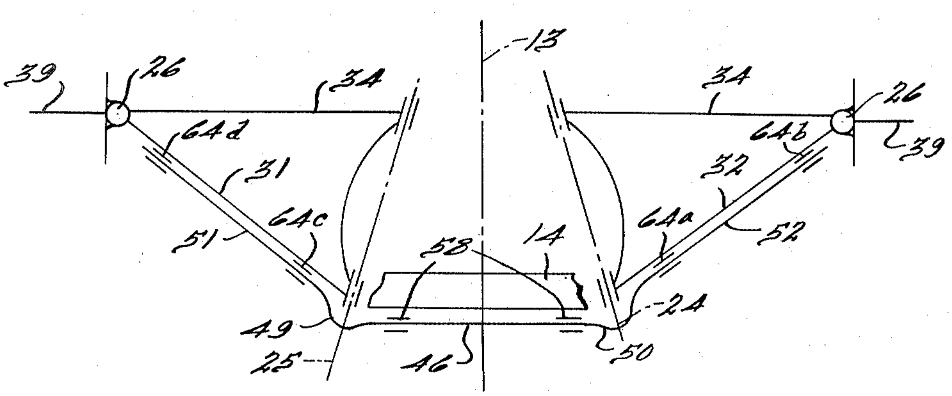
FIG. 13.
FIG. 14.
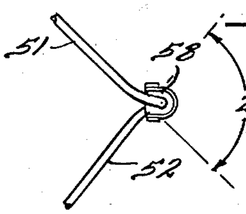
INVENTOR.
Herman C. Cuskie.
BY
Harness and Harris
ATTORNEYS.

United States Patent Office 2,770,453

Patented Nov. 13, 1956

2,770,453

AUTOMOTIVE VEHICLE STABILIZING MEANS

Herman C. Cuskie, Birmingham, Mich., assignor to Chrysler Corporation, Highland Park, Mich., a corporation of Delaware Application September 9, 1952, Serial No. 308,593

8 Claims. (Cl. 267—11)

The present invention relates to automotive vehicles and more particularly to improvements in an anti-roll stabilizer or sway bar means for controlling the bodies of such vehicles.

An object of the invention is to provide an efficient and low cost anti-roll stabilizing means which is especially adapted for vehicles having independently sprung ground wheels.

Another object of the invention is the provision of a stabilizing means as aforesaid which when employed in association with steerable ground wheels does not interfere with or restrict steering movement of such wheels and thus makes possible a short turning radius for the vehicle.

A yet further object is the provision of a stabilizer suitable for a sprung vehicle having opposed independent wheel suspensions, such that the rate of the load springs is not interfered with in the resilient suspension function of the springs, yet a stabilizing tendency is ever in existence owing to the presence and the strategic location of the stabilizer.

Yet another object is to provide a simple stabilizer bar formed of one integral piece of material in which no joints or intermediate connections need be provided.

According to a feature of this invention, at least the lateral portions of the one-piece stabilizer bar are received in yieldable blocks or in bearings carried by the lower control arms of each suspension so as to be rotatably and axially free for shift throughout their entire length along the arms.

A further object of the invention is to provide a supported stabilizer bar of one-piece construction which has at least some portions which are axially shiftable so as to compensate for structural adjustments and able to move relative to the support by a means carrying it so as to have at no point an absolutely fixed connection therewith.

A still further object is the provision of an anti-roll stabilizing means in the form of a torsion bar structure which in association with independent wheel suspensions having the foregoing advantages, will readily accommodate the installation and removal of a lifting jack.

For the carrying out of the invention in conjunction with the independent wheel suspensions including upper and lower link members connected to a wheel at their outer ends by means of a wheel-carrying structure, there is preferably provided a torsion bar for the oppositely disposed suspensions having the center or torsion section thereof disposed transversely of the vehicle frame and having the lateral ends thereof located immediately adjacent the associated lower link member and rotatably associated with the latter member. Each of said lateral ends is preferably rotatably connected by an insulating bushing or bearing at one or more points on the associated lower link member along a side of the latter. Many of the common stabilizer bars heretofore commercially used on vehicles have been adapted to be connected to a wheel-connected element which extends laterally relative to the longitudinal axis of the vehicle and which is adapted to oscillate about a generally horizontal swing axis extending substantially longitudinally with respect to the frame. Such a torsion bar extends laterally of the vehicle frame, is rotatably supported thereon, and is provided with arms extending longitudinally of the vehicle, the arms being each directly or indirectly connected to the adjacent wheel-connected element at a location substantially in a vertical plane containing the arm. Inasmuch as the torsion bar arms when oscillated, seek to remain in their respective said vertical planes which extend longitudinally of the vehicle, and inasmuch as the wheel-connected elements when oscillated about their swing axes assume a continually changing position toward and away from the said vertical planes, the connections between each of the free ends of the arms of the bar element and the associated wheel-connected element must substantially yield and compensate for the difference in path movement between the two elements or in absence of substantially yielding connections, the arms themselves must be of sufficient length so as to deflect. Familiar connections which have been applied include flexing linkages, blocks of distortable material, and other means which compensate for this difference in movement. However, each of these devices is objectionable in that extra cost is involved and a loss of power transfer is unavoidable when such substantial distortion occurs. In the present improved construction, the torsion bar proper, which may have short arms, follows a path of movement coinciding with the path of movement of the wheel-connected elements such that it is not necessary or even desirable to provide flexing linkages, substantially distorting blocks, or radically deflecting free arms for the sway bar for compensating for a wide latitude of distortion between relatively moving elements.

According to one feature of certain embodiments of the present invention, the stabilizer bar is provided with supporting bearings attached to the frame, which bearings are intermediate vertical planes containing the inner swing axes of the suspension arm to which the stabilizer is also connected and which bearings are in close juxtaposition to their immediately adjacent swing axis.

According to one feature of certain embodiments of the present invention, a vehicle having sprung and unsprung weights rollable with respect to one another, is equipped with an anti-roll stabilizer constituted solely by a relatively short one-piece sway bar which can adequately perform the anti-roll stabilizing function.

According to a feature of another embodiment of the invention, a one-piece anti-roll stabilizer bar which is somewhat longer than the embodiments of the immediately preceding paragraph, is employed to provide a slightly stiffer stabilizing function.

Further features, objects and advantages will either be specifically pointed out or become apparent when for a better understanding of the invention, reference is made to the following written description taken in conjunction with the accompanying drawings in which:

Figure 7 illustrates diagrammatically the angle to which the bar rocks when the vehicle moves to the extreme positions shown in Figure 6;

Figure 8 is a diagrammatic view illustrating the twisting of the bar when one wheel is raised relative to the other wheel;

Figure 9 is a diagrammatic view illustrating the angle to which the bar twists when the wheels assume the position shown in Figure 8;

Figures 10 and 11 are top plan and front elevational views illustrating an alternate construction used when it is desirable to reduce the angular twist in the bar member from that which would ordinarily be imposed by a given wheel movement;

Figure 12 is a detail taken along the section lines 12—12 in Figure 11; and

Figures 3, 4, 5:
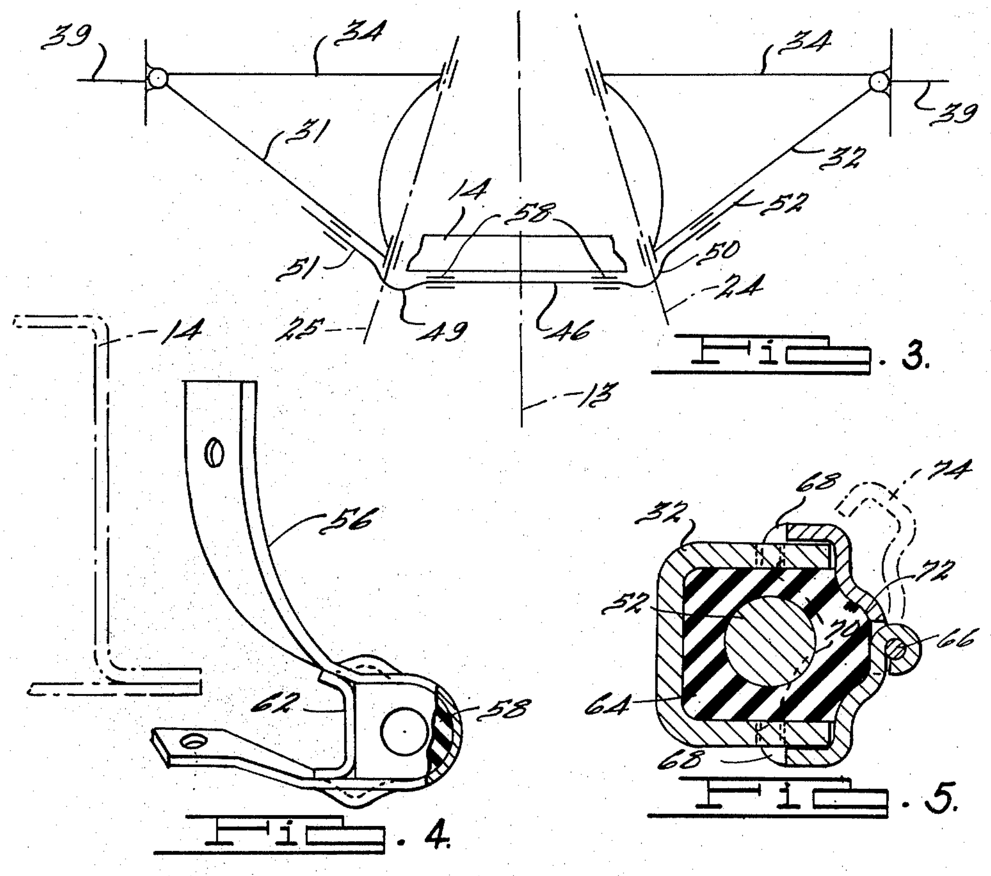
Figures 4 and 5 are each directed to a structural element of the construction of Figure 1.

Figures 13 and 14 are diagrammatic views corresponding to Figures 3 and 9 preceding, but illustrating still another alternate construction in which the angle of twist imposed upon the torsion section of the bar is increased from that which would normally occur in the construction shown in Figures 3 and 9.

Figure 1:
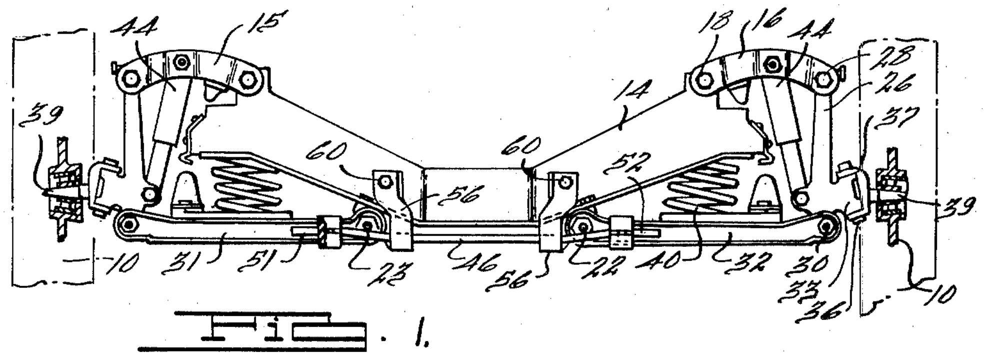
Figure 1 is a front elevational view of a typical automotive vehicle construction having the present torsion bar invention applied thereto.
Figure 2:
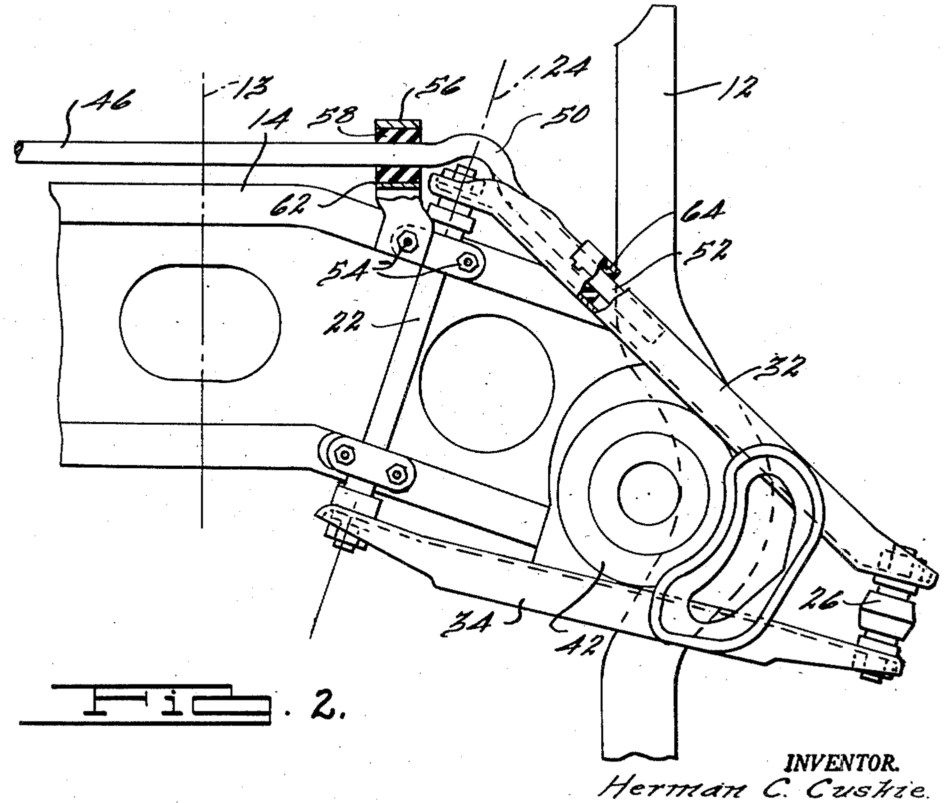
Figures 2 and 3 are respectively a bottom plan view and a top diagrammatic view of portions of the vehicle construction appearing in Figure 1.

In Figures 1–3 of the drawings, the invention is shown in connection with a pair of front steerable ground wheels 10 disposed opposite each other at the sides of a frame structure having a longitudinal axis 13 and including a longitudinally extending side rail 12 and a front crossmember 14 which is adapted to support a body structure in the conventional manner. The frame structure is suspended by the wheels 10, one on each side of the longitudinal central axis 13 by means of a system of independent suspensions which, as illustrated, include a set of upper link members 15 and 16 and a set of lower link members 31 and 32 which extend laterally outwardly with respect to the vehicle. For the sake of brevity, the structure which is associated with the members 16 and 32 at one side only of the vehicle will be described.

The member 32 has, at its inner end, an articulated connection to a pivot bar 22 carried by the frame structure so as to provide for oscillation of the member 32 about a generally horizontal swing axis 24 which extends substantially longitudinally with respect to the frame structure. The members 16, disposed vertically above the member 32, is pivoted by means of a pivot bar 18 so as to swing about an upper relatively horizontal axis with respect to the frame structure. A swinging type of movement is thereby provided for these two members 16 and 32 which may be incorporated in the usual vertically spaced wishbones or A-frame structures and which extend laterally outwardly and rearwardly of the vehicle for connection with the wheel by means of a generally upright wheel-carrying knuckle support arm 26 which is articulately connected at 28 and 30 respectively with the upper and lower link members 16 and 32. The link member 32 for the lower A-frame has a companion link member 34 forming the opposite side of the A-frame and these members 32 and 34 are channel-shaped in cross section and open away from each other. The upright arm 26 may carry a knuckle portion 33 having the usual kingpin 36 for swiveling a companion knuckle portion 37 which carries a spindle 39 for the associated wheel 10 and thereby accommodates steering movement of the wheels in known manner.

A load spring 40 acts between the frame member 14 and a seat 42 supported by the lower A-frame members 32 and 34 for yieldingly supporting the weight of the frame structure between the ground wheels 10. The independent wheel suspension accommodates rising and falling movement of each ground wheel 10 relative to the frame structure independently of the remaining ground wheels of the vehicle, the link members 16 and 32 maintaining the associated arm in the desired upright position. A suitable shock absorbing means indicated at 44 may be associated with each wheel to provide the necessary damping characteristics.

The construction so far described is a conventional independent wheel construction and is illustrated solely to show how the present improved stabilizer bar may be used with such a conventional wheel suspension. This conventional construction is ideally suited for use with the presently improved stabilizer bar inasmuch as it permits the bar to be rotatably secured to the vehicle structure by means of the simplest type of bearings.

A metal torsion bar 46, preferably of steel, of general bow-shape between its ends is provided which comprises a center torsion section and a pair of lateral outer end portions 51, 52 which are bent rearwardly at 49 and 50 respectively, so as to form angular junctions with the center section and which extend rearwardly with respect thereto in a diagonal direction to lie within the channels of the members 31, 32 of the lower A-frames. The lateral outer end portions 51, 52 are also offset slightly upwardly at 49, 50 with respect to the center section of the bar 46 so as to occupy a horizontal plane slightly vertically spaced with respect to, but in substantial juxtaposition with the horizontal plane containing the center section. The lateral outer end portions 51 and 52 are short and present a stump-like appearance, and the junction between each of these stump-like end portions and the center section of the stabilizer bar 46 is located substantially at the intersection of the stabilizer bar 46 with a vertical plane through the pivotal axes 24, 25 of the respective adjacent arm members. The center torsion section of the bar 46 is frame-mounted for rotative movement with respect to the crossmember 14 by means of a pair of spaced-apart brackets 56, each containing a bearing 58. The spaced-apart bearings 58 are coaxial and are positioned intermediate the above-noted vertical plane containing the pivotal axes 24, 25 of the arm members 31, 32 respectively, and each bearing 58 is a close-in-bearing, that is, disposed in close juxtaposition to its immediately adjacent vertical plane containing the pivotal axis. The bearings 58 are slightly deformable and may be formed of yieldable rubber, or other elastomeric material such as synthetic resins. The inner surface or core of each of the bearings 58 intimately receives the center torsion section of the bar and is either initially bonded thereto or gradually becomes bonded thereto during the course of aging and service due to the compression pressures existing between the inner surface of the bearing 58 and the metal of the bar 46. Each of the pivot bars 22, 23 for the lower A-frame members is connected by means of a set of four bolts 54 to the underside of the frame crossmember 14, and one of these bolts 54 is utilized to secure the bottom end of the bearing supporting bracket 56 to the frame crossmember 14. A similar single bearing 64 formed of similar material to the bearing 58 surroundingly receives each of the relatively short outer end portions 51, 52 of the one-piece bar 46 and similarly is either bonded thereto or eventually becomes bonded thereto owing to the resulting intimate engagement. The bearings 58, 64 to the left of the longitudinal vehicle axis 13 are spaced from one another both radially and axially of such axis 13, and as herein disclosed are spaced from one another both radially and axially of the adjacent swing axis 25. The corresponding bearings 58, 64 to the right of the vehicle axis 13 are similarly relatively spaced both with respect to the vehicle axis 13 and the adjacent swing axis 24.

The bearings 64 are preferably mounted in juxtaposition to the respective ends of the stub portions 51, 52 and by the very nature of the stub character of the sway bar 46 are in proximity to the pivotal axes 24, 25. Where it is necessary to have the bearings 64 very close-in to the inner pivotal axis of the arm to which they are respectively mounted, for instance, in the case where very short stub-like portions are to be used, it is preferred that the bearing be of non-rubbery character, preferably rigid, capable of accommodating the greater stresses. For eaxmple, the bearing may be of bronze or other metal or may be an "O and S" or a "Neveroil" bushing, the latter comprising a wax or lubricant impregnated, woven fibrous core layer surrounded by a metallic jacket.

As best shown in Figure 4, the bearings 58 for the center section of the bar 46 are compressed between a loop in the bracket 56 and an inner strap 62 welded thereto.

As best seen in Figure 5, the bearings 64, one for each of the bar ends, are seated in the channel sections of the arms of the lower A-frame members, for instance, the arm 32, and are held in place by means of a two-leaf snap-on hinge device of which the two leaves are connected at their adjacent ends by means of a hinge pin 66. Adjacent this point of connection, a protuberance or nose 72 formed on the bearing 64, is compressed so as to engage and impart a tongs-like action to the snap-on hinge device. The extreme ends of the two hinge leaves are formed with one or more lugs 68 which are adapted to be received in a set of apertures 70 formed in the opposite legs of the channel section 32. For attachment to the channel section 32, the lugs 68 on the lower leaf are placed in the lower leg apertures through the channel whereupon the upper leaf from a dotted line position 74 shown by dotted lines in Figure 5, may be snapped over on to the upper leg of the channel section 32 and the lugs thereof received in their proper apertures. For removal, a suitable tool such as a screw driver may be inserted between the hinge device and the channel 32 adjacent one of the sets of lugs, and the hinge device can thereafter be pried to the point where it will snap free due to the precompression of the nose 72 formed on the deformable bearing 64.

Figure 6:
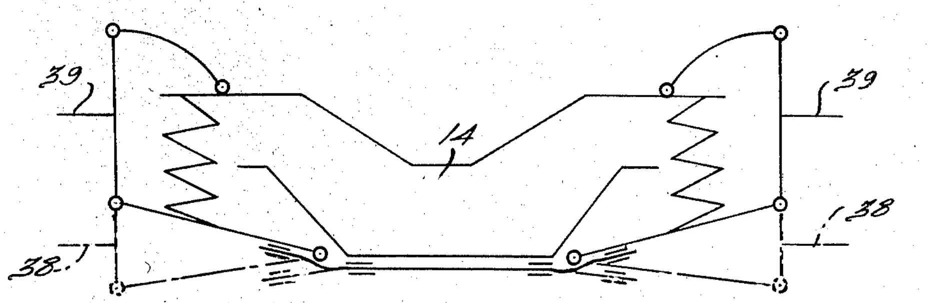
Figure 6 shows a diagrammatic view illustrating how the torsion bar works as a unit when the vehicle reciprocates vertically relative to the wheels.

The operation of the bar 46 so far described, is illustrated in the diagrammatic Figures 6–9. In Figure 6 it will be noted that the two spindles may move upwardly relative to the frame member 14 from the dotted line position shown by the dotted lines 38 to the solid line position shown by the lines 39 in which case the bar 46 will simply rock as a unit from the dotted line position 45 in Figure 7 to the solid line position 46 there shown. This rocking movement is illustrated by the angle X in Figure 7 and is accomplished without imparting any substantial torsional twist in the bar proper. When one spindle 39 is raised relative to the other, as shown in Figure 8, then one end of the bar 46 is twisted relative to the other end and the twisting action imparts a torsional twist in the center section of the bar to the extent illustrated by the angle Y in Figure 9.

In the event that a slightly less stiff stabilizing action is desired, an alternate construction as shown in Figures 10 and 11, may be used in connection with the independent suspensions which will modify to some extent the angle of twist of the bar 46. A set of laterally extending arm members 31, 32 is provided and connected to a frame crossmember 14 by means of a pair of pivot bars 23, 22 for swinging movement about a set of respective horizontal axes 25, 24 which extend substantially longitudinally with respect to the axis 13 of the vehicle. Each arm member 31, 32 is wheel-connected by means, for instance, of an articulated connection to a wheel-carrying upright arm 26. Another lower arm member 34 cooperates with the front arm member 32 to define a lower A-frame support for the wheel, not shown. The bar 46 is of the linkless or one-piece type and has a center torsion section disposed generally between the swing axes 25, 24 and a pair of relatively short or stump-like lateral end portions 51, 52 which are bent at 49 and 50 respectively, so as to form angular junctions with the center section and extend rearwardly in a diagonal direction with respect to the center section, and lie within the channels formed by the lower A-frame arms 31, 32. The diagonal end portions 51, 52 are also slightly upwardly offset at the bends 49, 50 with respect to the center torsion section of the bar 46 so as to occupy a horizontal plane which is vertically spaced with respect to but in substantial juxtaposition with the horizontal plane containing the center section. The junction between each of the generally diagonal end portions 51, 52 and the central torsion section of the bar 46 is located substantially at the intersection of the bar with a vertical plane through the respective pivotal axes 25, 24 of the adjacent arm members. The bar 46 is free from connection with the sprung and unsprung portions of the vehicle except for a single bearing means 80 provided at each end thereof and carried by the adjacent one of the control arms 31, 32. Each single bearing means 80 has a set of double ears 82 which are apertured at 84 and give the means 80 the form and effect of a double bearing member in which the stump-like bar end portions 51, 52 are each journalled at two points disposed in closely spaced adjacency with respect to one another, and with respect to the adjacent one of swing axes 25, 24. Such two points to the left of the longitudinal vehicle axis 13 will be noted to be spaced from one another both radially and axially of such axis 13 and as herein disclosed, are spaced from one another both radially and axially of the adjacent swing axis 25. The corresponding points of journalment to the right of the vehicle axis 13 are similarly relatively spaced both with respect to the vehicle axis 13 and the adjacent swing axis 24. The apertures 84 may be provided with a core of the "O and S" or "Neveroil" material as described above. In view of the fact that the center torsion section of the bar 46 is not directly frame-connected, a slightly greater freedom of movement is provided for the bar and hence a slightly less stiff anti-roll stabilizing action is afforded than in the bar of the embodiment of Figures 1–9.

As best shown in Figure 12, the single bearing means 80 of a modification of Figure 10 is a rigid one-piece U-shaped metal bracket, preferably of steel, and having the double ears 82 thereof in slightly spaced apart relationship and connected by a base which is received in the channel section of the front arm member of each lower A-frame, for instance, the channel section of the arm member 32. The rigid single bearing means 80 is preferably located adjacent the pivotal axes 24 and 25 and at such a distance that the flexibility of the stub portions 51, 52 does not interfere with the adjacent control arms 31, 32. The double ears 82 and the base of the unitary U-shaped bracket 80 have a slight interference fit with the inside of the channel section 32 in order to prevent any latitude or play of the single bearing means. The bearing means 80 is retained in the channel section 32 by means of a bolt and a fastener 86, 88 which bolt passes through a pair of registering apertures 90, 92 formed respectively in the base of the single bearing means 80 and in the base of the channel section 32.

Diagrammatic Figures 13 and 14 correspond to the respective Figures 3 and 9 of the first described embodiment but show an alternate construction in which the end portions 51, 52 of the bar similarly identified 46, are considerably longer than the stump-like end portions of the preceding bars. Moreover, not only are two spaced-apart bearings provided on the frame member for rotatably supporting the bar directly to the frame, but also two spaced-apart bearings are provided on each arm member as will hereinafter be set forth in greater detail. Accordingly, a slightly stiffer and more pronounced anti-roll effect is provided. Thus in Figures 13 and 14 the conventional parts of the suspension include a vehicle frame crossmember 14 extending transversely relative to a longitudinal axis 13 of the vehicle, a pair of laterally extending arm members 31, 32 which are articulately connected at their inner ends to the frame 14 to swing about a pair of horizontal axes 25, 24 which extend substantially parallel to the longitudinal vehicle axis 13, and a pair of upright arms 26 to which the members 31, 32 are articulately connected at the outer ends of the latter. The upright arms 26 each carry a wheel spindle 39 for connecting the wheel to the arm members 31, 32 and the rest of the suspension. The bar construction 46 is of metal having a general bow-shape between its ends 51, 52 and comprises a center torsion section which extends between the swing axes 25, 24 and is rotatably mounted by being held in two frame-connected spaced-apart bearings 58 adjacent these swing axes. The ends of the bar 46 are bent at 49 and 50 rearwardly in a diagronal direction with respect to the center section 46 such that a set of bends 49 and 50 form the junctures between the center section and the pair of relatively long outer end portions 51, 52 which lie within the channels formed by the lower A-frame members 31, 32. The lateral outer end portion 52 is supported in a bearing 64$^a$ carried by the arm member 32 adjacent the point of articulate connection of the latter to the frame 14 which provides for swinging movement of the arm 32 about the swing axis 24. Similarly, on the opposite side of the longitudinal axis 13 of the vehicle, a bearing 64$^c$ is provided for the stabilizer end portion 51 and is carried by the arm member 31 adjacent the swing axis 25 provided at the point of articulate connection of the arm member 31 and the frame crossmember 14. A bearing 64$^b$ surrounds the stabilizer end portion 52 and is carried by the arm member 32 at a location generally adjacent the point of articulate connection of the arm member 32 and the upright arm 26. Another bearing 64$^d$ surrounds the bar end portion 51 and is carried by the arm member 31 at a location adjacent the point of articulate connection of the latter and the upright arm 26. The junction formed by the bends 49, 50 between each of the generally diagonal long end portions 51, 52 and the straight central section of the stabilizer bar 46 are located substantially at the intersection of the bar 46 and a vertical plane through the pivotal axes 25, 24 of the respective adjacent arm members 31, 32. The three bearings 58, 64$^c$, 64$^d$ to the left of the longitudinal vehicle axis 13 are each spaced with respect to the other two both radially and axially of such axis 13 and as herein disclosed, are each spaced with respect to the other two both radially and axially of the adjacent swing axis 25. The corresponding bearings 58, 64$^a$, 64$^b$ to the right of the vehicle axis 13 are similarly relatively spaced both with respect to the vehicle axis 13 and the adjacent swing axis 24. All the just-named bearings are formed of yieldable rubber or other elastomeric material such as synthetic resins so as to be slightly deformable and have an inner surface core means which intimately engages the metal surfaces of the bar 46.

The operation of the bar 46 of Figures 13, 14 is very much similar to the operation of the bar of the preceding Figures 1–9 except as to the degree of stiffness which the bar affords. In some instances the size requirements for a particular load call for a bar in which the stress under the load would be too great. The instant embodiment of Figures 13, 14 affords a means of obtaining greater roll stiffness with a smaller, more elastic bar. Thus in similarity to the named preceding embodiment, when the two spindles 39 in Figure 13 move upwardly relative to the frame member 14, the bar 46 will simply rock as a unit from one position to the other without imparting any substantial torsional twist to the bar proper. When one spindle 39 is raised relative to the other, then one end of the bar is twisted relative to the other end, which twisting action imparts a torsional twist in the center section of the bar to the extent illustrated by the angle Z in Figure 14.

It will be noted that the swingable arm member bearings 64$^c$ and 64$^d$ are coaxial with respect to one another and that the bearings 64$^a$ and 64$^b$ are also coaxial with respect to one another. Hence as will be noted in the diagrammatic showing of Figure 14, the lateral outer end portions 51, 52 of the bar 46 are retained more or less straight between the swingable arm member bearings and the longitudinal axis of each of the ends 51, 52 substantially coincides at all times with the respective coaxial bearings 64$^c$, 64$^d$, and 64$^a$, 64$^b$. Such prevention of substantial flexure in the lateral outer ends 51, 52 of the bar whether extremely long as in Figure 14 or somewhat shorter, does as contrasts the preceding embodiment of Figure 9, increase the anti-roll stiff somewhat, even though at the same time it may subject the portions of the bar adjacent each of the bearings 64$^a$, 64$^c$ to somewhat higher stresses than the corresponding bearings of Figure 3. This increased anti-roll stiffness may, however, be found a desirable function in certain makes of automobiles.

The bar 46 according to the preceding embodiments, is preferably of a uniform cross section and of the linkless or one-piece type. It will be readily preceived that the bar 46 can be applied to each of the rear links 34 in place of each of the front links 31, 32 of the lower A-frame structures or conceivably could be applied to one of the members, for instance 15 and 16, of each of the upper control arm structures. Furthermore, the invention may be utilized in connection with the rear or nonsteering road wheels of the vehicle instead of or in addition to the front or steerable wheels as illustrated. In any case, each bar 46 will be associated only with one pair of oppositely disposed swinging arms.

It will be noted that though both a relatively long and a relatively short sway bar have been illustrated in the respective embodiments, all embodiments offer the advantage of relatively inexpensive bearings which may be used between the bar and the supporting vehicle structure as the respective members move toward and away from one another, and it is not necessary to provide for any substantial distortion between these members notwithstanding the fact that there is a slight end play afforded between the bearings on the swinging arm members and the lateral outer end portions of the sway bars 46. The different degrees of stiffness available will also be appreciated and these varying degrees of stiffness as offered by the contrasting embodiments are made possible in addition to the further variations of stiffness which can be introduced by means of different heat treatings of the metal bar 46 or by use of bar stock having different diameters of cross section maintained uniformly thereacross.

Variations within the spirit and scope of the invention described are equally comprehended by the foregoing description.

What is claimed is:

1. In combination, a longitudinal vehicle frame, an individual wheel suspension at each side of the frame and each including a lateral arm connected to the frame for swinging movement about an axis lying substantially longitudinally with respect to the frame, the axis of oscillation of one lateral arm being disposed in a horizontal plane containing the axis of oscillation of the other said lateral arm, and resilient bar means extending transversely of the frame adjacent said lateral arms, said bar means having a substantially straight central section and opposite end portions extending generally diagonally with respect to said central section, the junction between each of said generally diagonal end portions and said central section of the bar means being located substantially at the intersection of said central section with a vertical plane containing the axis of oscillation of the adjacent lateral arm, there being a first means of yieldable material mounted on the frame at each side thereof connecting the portion of the central section of said bar means adjacent its respective junction point at that side to said frame at a location in close juxtaposition to the axis of oscillation of the lateral arm at that side, there being a second means of yieldable material at each side of the frame connecting the end portion of the bar means at that side to the lateral arm at that side adjacent the axis of oscillation of the latter.

2. In combination, a longitudinal vehicle frame, an individual wheel suspension at each side of the frame and each including a lateral arm connected to the frame for swinging movement about an axis lying substantially longitudinally with respect to the frame, the axis of oscillation of one lateral arm being disposed in a horizontal plane containing the axis of oscillation of the other said lateral arm, and resilient bar means extending transversely of the frame adjacent said lateral arms, said bar means having a substantially straight central section and opposite end portions extending generally diagonally with respect to said central section, the juncture between each of said generally diagonal end portions and said central section of the bar means being located substantially at the intersection of said bar means with a vertical plane containing the axis of oscillation of the adjacent lateral arm, there being a first bearing means mounted on the frame at each side thereof connecting the portion of the central section of said bar means adjacent its respective junction point at that side to said frame at a location in close juxtaposition to the axis of oscillation of the adjacent lateral arm at that side, there being a second bearing means at each side of the frame connecting the end portion of the bar means at that side to the adjacent lateral arm at that side.

3. In combination, a vehicle structure comprising a load-carrying supported part having a longitudinal axis, and other parts supporting said load-carrying supported part disposed adjacent opposite sides of said load-carrying supported part, each supporting part including wheel-carrying means, a laterally extending arm, and a load-supporting spring intermediate said supported part and said arm, said arm having a generally lengthwise extending portion articulately connected at its outer part to said wheel-carrying means and being mounted at its inner part to said supported part for rising and falling movement relative to the latter about a generally horizontal swing axis; an elongated resilient stabilizer having substantially a bow shape between its ends extending generally transversely of said longitudinal axis of the supported part adjacent said supporting parts, said stabilizer having a substantially straight mid portion and a pair of lever-like legs offset in two directions from said mid portion approximately at the places where the said axes of the arms when extended cross the said mid portion, each leg comprising a length having a longitudinal axis and extending into juxtaposition with said lengthwise portion of the respective arm of the adjacent supporting part, the longitudinal axis of said length passing adjacent the said generally horizontal axis of said arm of the said adjacent supported part; and bearing means at each side of the vehicle structure mounting said stabilizer to said structure whereby it is operable by torsional deflection to oppose relative rising and falling movement of said arms, the bearing means being disposed at each side of the vehicle structure journalling the part of said stabilizer at that side at two points, one of said two points being closely adjacent the swing axis of the adjacent arm for accommodating rising and falling movement of the same relative to the supported part yet accommodating rotative movement of said lengths of the legs of said stabilizer about their longitudinal axes relative to the arms to which they are secured, said two points being spaced from one another both radially and axially of the longitudinal axis of the supported part and on opposite sides of said generally horizontal swing axis.

4. In combination, a vehicle frame having a longitudinal axis, wheel supporting members, an individual wheel suspension at each side of the frame and each comprising a laterally extending arm pivotally connected at one end to a wheel supporting member and pivotally connected at the other end to the vehicle frame for swinging movement about a substantially horiozntal swing axis extending in a generally longitudinal direction, a transversely disposed pair of coaxial bearings secured to said frame between the vertical planes containing the swing axes of the arms and in adjacent relationship thereto, and a one-piece stabilizer bar of a general bow shape between its end portions and having a central torsion section therebetween journalled for rotation in said bearings, there being means including core means at each side of the frame attaching the end portion of the stabilizer bar at that side to the arm at that side adjacent at least one of the points of pivotal connection of the same.

5. In combination, a vehicle frame having a longitudinal axis, wheel connected members, an individual suspension arm at each side of the frame and extending laterally and being pivotally connected at one end to a wheel supporting member and pivotally connected at the other end to the vehicle frame for swinging movement about a substantially horizontal swing axis extending in a generally longitudinal direction, a transversely disposed pair of coaxial bearings secured to said frame between the vertical planes containing the swing axis of the arms and in adjacent relationship thereto, and a one-piece stabilizer bar of substantial bow shape between its end portions and having a central torsion section therebetween journalled for rotation in said bearings, there being yieldable core means at each side of the frame attaching the end portion of the stabilizer bar at that side to the arm at that side adjacent at least one of the points of pivotal connection of the same.

6. In combination, a longitudinal vehicle frame, an individual wheel suspension at each side of the frame and each including a lateral suspension member swingably connected to the frame to oscillate up and down with respect to the frame as a center, the center of oscillation of one lateral suspension member being disposed in a horizontal plane containing the center of oscillation of the other said oscillation member, and resilient bar means extending transversely of the frame adjacent said suspension members, said bar means having a central torsion section and opposite end portions extending generally diagonally with respect to said central section, the junction between each end portion and said central section of the bar means being located substantially in a vertical plane containing the center of oscillation of the adjacent lateral suspension member and generally dividing the angle between this end portion and said central section, there being a first means of yieldable material at each side of the frame connecting the portion of the central section of the bar means adjacent its respective junction point at that side to a location on said frame in close juxtaposition to the center of oscillation of the lateral suspension member at that side, there being a second means of yieldable material at each side of the frame connecting the end portion of the bar means at that side to the lateral suspension member at that side adjacent the center of oscillation of the latter.

7. In combination, a vehicle frame having a longitudinal axis, wheel connected members, an individual wheel suspension at each side of the frame and each comprising a laterally extending suspension member articulatedly connected at a point on the outer end thereof to a wheel connected member and swingably connected at a point on the other end thereof to the frame for up and down swinging movement with respect to the latter, a transversely disposed pair of coaxial bearings mounted to the frame, and a substantially horizontally disposed one-piece stabilizer bar of a general bow shape having diagonally outwardly angled end portions and a central torsion section therebetween, said bar being rotatably mounted in said coaxial bearings at locations on the bar inwardly of the respective junctures between the central section thereof and the diagonally angled end portions and said bearings being spaced apart so as to be disposed between and in general juxtaposition to the substantially vertical bisecting planes through the thus diagonally included angles and just-named junctures of the bar and being further disposed in closely spaced adjacency to such junctures, there being means including core means at each side of the frame attaching the end portion of the stabilizer bar at that side to the suspension member at that side adjacent at least one of the named points of end connection of the same as aforesaid.

8. In combination, a vehicle frame having a longitudinal pair of frame side rails and a frame cross member at the forward end thereof, means for suspending a dirigible vehicle wheel at each side of said forward end of said frame including a separate control arm for each wheel pivotally mounted to said frame cross member, the axes of oscillation of said control arms being disposed in a common horizontal plane, a stabilizer bar including a central transversely extending torsion section and two offset end portions, said torsion section and said end portion lying in said horizontal plane with each end portion forming an obtuse angle with said torsion section, bearing means for securing each of said end portions to a separate one of said control arms, each of said end portions being secured to its associated control arm at only a single location thereon, bearing means supported by said frame cross member securing said torsion section to said frame cross member at two transversely spaced locations intermediate said frame side rails, a separate one of said spaced locations being adjacent each pivotal axis of said control arm, each of said last named bearing means being disposed intermediate said pivotal axes.

References Cited in the file of this patent

UNITED STATES PATENTS

| | | |
|---|---|---|
| 2,517,611 | Utz | Aug. 8, 1950 |
| 2,626,797 | Cuskie | Jan. 27, 1953 |

FOREIGN PATENTS

| | | |
|---|---|---|
| 659,599 | Great Britain | Oct. 24, 1951 |
| 663,012 | Great Britain | Dec. 12, 1951 |